United States Patent
Shachar et al.

(10) Patent No.: US 6,831,675 B2
(45) Date of Patent: Dec. 14, 2004

(54) SYSTEM AND METHOD FOR VIDEOCONFERENCE INITIATION

(75) Inventors: Yair Shachar, Ramat Gan (IL); Isac Winter, Givat Shmuel (IL); Yaron Menczel, Mevasseret Zion (IL)

(73) Assignee: V Con Telecommunications Ltd., Herziya (IL)

( * ) Notice: Subject to any disclaimer, the term of this patent is extended or adjusted under 35 U.S.C. 154(b) by 0 days.

(21) Appl. No.: 10/032,146

(22) Filed: Dec. 31, 2001

(65) Prior Publication Data

US 2003/0122923 A1 Jul. 3, 2003

(51) Int. Cl.[7] ................................................. H04N 7/14
(52) U.S. Cl. ............................. 348/14.08; 348/14.11; 348/14.12
(58) Field of Search ........................ 348/14.01–14.09, 348/14.1, 14.11, 14.12, 14.13; 379/202.01; 370/260, 261; 709/204

(56) References Cited

U.S. PATENT DOCUMENTS

| | | | | |
|---|---|---|---|---|
| 5,920,693 A | * | 7/1999 | Burkman et al. | 348/202.01 |
| 5,959,662 A | * | 9/1999 | Shaffer et al. | 348/14.08 |
| 6,430,176 B1 | * | 8/2002 | Christie, IV | 370/261 |
| 6,545,697 B1 | * | 4/2003 | Paraker et al. | 348/14.01 |
| 6,600,508 B2 | * | 7/2003 | Nakade et al. | 348/14.09 |
| 6,628,767 B1 | * | 9/2003 | Wellner et al. | 379/202.01 |
| 2001/0056466 A1 | | 12/2001 | Thompson et al. | |

FOREIGN PATENT DOCUMENTS

| | | | |
|---|---|---|---|
| EP | 0721266 A | 7/1996 | |
| EP | 0930768 A | 7/1999 | |
| JP | 360079887 A * | 5/1985 | H04N/7/14 |
| JP | 409037220 A * | 2/1997 | H04N/7/14 |
| WO | WO 99/14951 A | 3/1999 | |
| WO | WO 99/44363 A | 9/1999 | |

* cited by examiner

Primary Examiner—Melur Ramakrishnaiah
(74) Attorney, Agent, or Firm—Eitan, Pearl, Latzer & Cohen Zedek, LLP (57) ABSTRACT

A system and method accepting information regarding audio telephony sessions (e.g., a telephone calls) and, in response, initiating videoconferences via videoconference terminals associated with the audio terminals used for the audio telephony sessions.

24 Claims, 4 Drawing Sheets

SYSTEM AND METHOD FOR VIDEOCONFERENCE INITIATION

FIELD OF THE INVENTION

The present invention relates to videoconferencing; specifically, to a system and method for easy and convenient initiation of videoconferences.

BACKGROUND OF THE INVENTION

Currently, a user may generate an audio telephony call or session using an audio communication terminal such as a telephone or personal computer (PC). Initiation of such a session is extremely simple—typically, a user merely enters a telephone number of another party. Conversely, currently, the initiation of videoconference sessions is relatively complex. A separate and complex system may be required, including a centralized control system, which may require specialized instruction to operate. First, a user must ascertain whether or not the other party (or parties) with which the user wishes to have videoconference session possesses videoconference capabilities, and, if so, what their address is. Then, typically, a centralized control system must be operated to link the parties. Users wishing to hold a videoconference may not have access to or control over a specialized videoconference equipment. Therefore, it is difficult to quickly or spontaneously arrange videoconferences; advance scheduling is often required.

Furthermore, currently, it is not possible to initiate an audio telephony session and later to extend the session to include a videoconference without carrying out the complicated steps generally required for generating a videoconference session.

Therefore, a need exists for a system and method to allow for the quick and easy initiation of videoconferences. Furthermore, a need exists for a system and method to allow for the initiation of videoconferences from an audio telephony session.

SUMMARY OF THE INVENTION

Embodiments of the system and method of the present invention accept information regarding an audio telephony session (e.g., a telephone call) and, in response, initiate a videoconference via videoconference, preferably via terminals associated with the audio terminals used for the audio telephony sessions.

BRIEF DESCRIPTION OF THE DRAWINGS

The present invention will be understood and appreciated more fully from the following detailed description taken in conjunction with the drawings in which.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Figure 1:
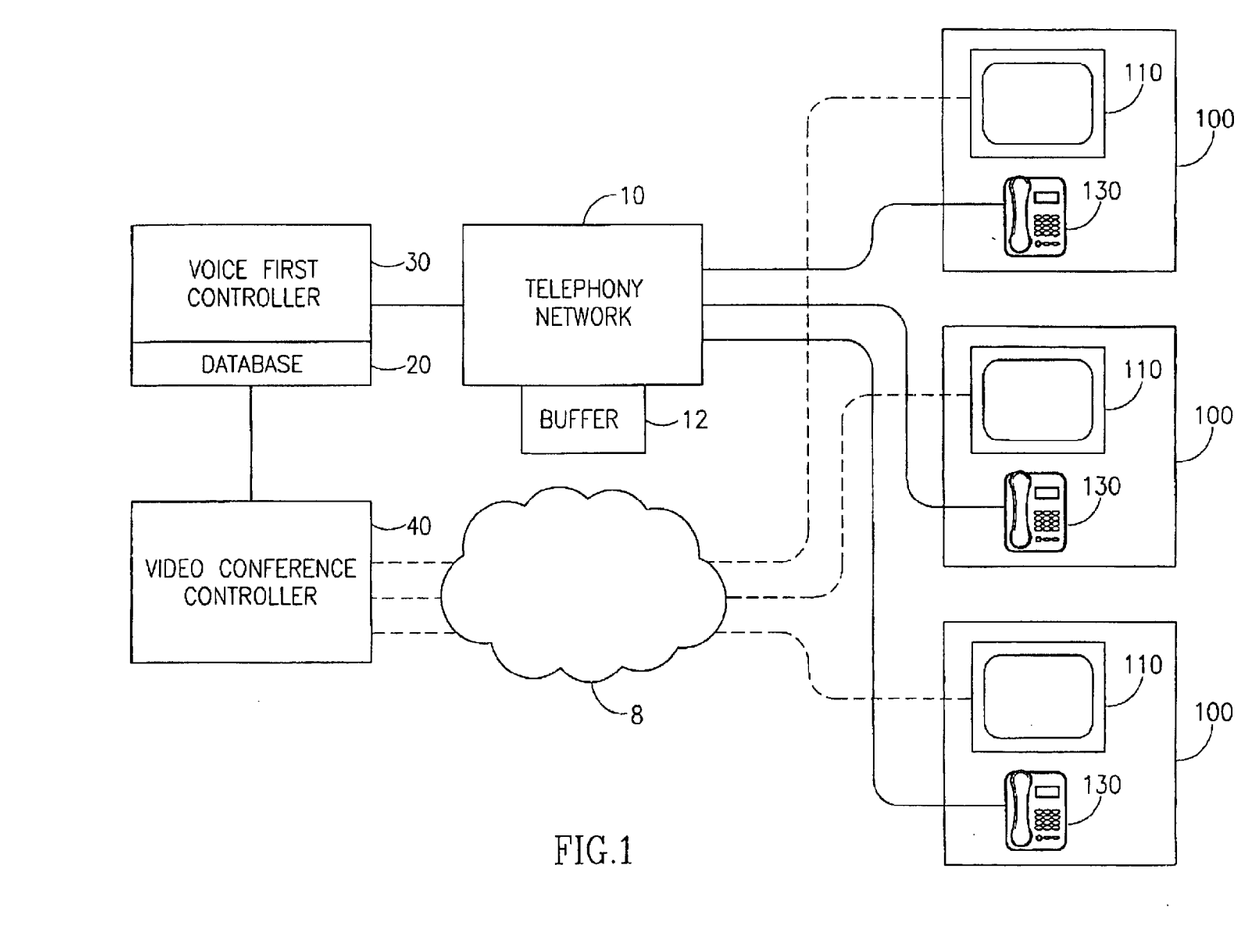
FIG. 1 depicts a network including a videoconference system according to an embodiment of the present invention.

FIG. 1 depicts a network including a videoconference system according to an embodiment of the present invention. Referring to FIG. 1, a plurality of user sites 100 each include videoconference terminals 110 and audio communication terminals 130. User sites 100 may be, for example, offices or other sites, and may be distributed within an organization or enterprise, or among various organizations and in addition sites outside organizations. For example, a user site 100 may be a user's home or office. Preferably, a videoconference terminal 110 is a device including the ability to acquire video data from a device such as a camera, a display device displaying the video data for videoconferencing such as a PC screen, and compression/decompression software and/or hardware. Other types of videoconference terminals may be used and fall within the scope of the invention. In alternate embodiments, associated audio communications terminals and videoconference terminals need not be physically located at the same site.

Preferably, an audio communication terminal 130 is a device allowing an audio conversation, for example a telephone or a PC having telephone-over-IP capabilities; other devices may be used for audio communication terminals. Preferably, each audio communication terminal 130 has a unique telephone address such as a telephone number or telephone number and extension combination; in alternate embodiments audio communication terminals may have other sorts of addresses, for example, an Internet Protocol (IP) address.

The audio communication terminals 130 are preferably interconnected via one or more telephony networks 10. Telephony networks 10 communicate with audio communication terminals, each other, and possibly other networks to conduct and transmit audio telephony. Telephony networks 10 may include, for example, a PBX system operating within an enterprise, or other networks transmitting audio and other information, such as intranets or the Internet, or cellular networks. Endpoints such as audio communication terminals 130 may be required to register or be registered with a telephony network 10 providing service to the endpoint, and the telephony network 10 may assign an ID, a telephone number/address and/or an extension to endpoints.

In an exemplary embodiment a telephony network 10 includes a buffer 12 for storing portions of audio conversations for delaying the timing of such conversations. In alternate embodiments such buffering need not be required, or the buffering functionality may be provided by different systems.

Other methods of interconnecting audio communication terminals 130 may be used. A communications network 8 may be available to interconnect various devices, and to augment the interconnection provided by networks such as telephony networks 10. The communications network 8 may include a series of networks, such as the Internet, local LANs, intranets (such as enterprise intranets), DSL or xDSL lines, cellular networks, and other networks or combinations of networks.

A videoconference controller 40 is in communication with videoconference terminals 110 via networks such as the communications network 8. The videoconference controller 40 may initiate a videoconference between various videoconference terminals 110. The videoconference controller 40 may be a known videoconference controller, such as the Media Xchange Managers™ provided by VCON, of Herzliya, Israel. In an exemplary embodiment, the videoconference controller 40 includes common videoconference capabilities, such as managing and configuring endpoints, call initiation, call transfer, conference calling, and other features.

In an exemplary embodiment, a database 20 stores information on registered users or user sites 100. Such information may include, for example, a telephone number or other address of an audio communication terminal 130, an IP address, Media Access Control (MAC) address, or other address of a videoconference terminal 110, and/or other information such as a user name or ID, physical location, alternate contact information, etc. The database 20 may preferably be used to produce the address of a videoconference terminal 110 when presented with the address (e.g., telephone number) of an audio communication terminal 130 located at the corresponding user site 100 of the videoconference terminal 110. In alternate embodiments, multiple audio communication terminals 130 may be so associated with a videoconference terminal 110, and multiple videoconference terminals 110 may be so associated with an audio communication terminal 130. The database 20 may be implemented through known methods, such as by using databases implementing the Lightweight Directory Access Protocol (LDAP), the Open Database Connectivity (ODBC) standard, or via other methods, such as methods not including standards. In alternate embodiments a separate database may not be needed, and information linking audio communication terminals 130 and videoconference terminals 110 may be linked in other manners. A telephony network 10 and endpoints such as audio communication terminals 130 and videoconference terminals 110 may be required to register or be registered with the database 20.

In an exemplary embodiment, a voice first controller 30 is in communication with the database 20, the videoconference controller 40, and also with one or more telephony networks 10. The voice first controller 30 may be in communication with other networks such as communications network 8; such networks may provide a link to telephony networks 10 or other entities. The voice first controller 30 preferably operates to detect an audio communication (e.g., an audio telephony call or session) between two or more audio communication terminals 130, and, in response requests the videoconference controller 40 to initiate a videoconference between the videoconference terminals 110 located at the user sites 100 possibly including the audio communication terminals 130 conducting an audio telephony session.

Preferably, certain telephony networks 10 include functionality allowing reporting of audio telephony sessions among audio communication terminals 130 to other equipment. Such reporting may include information such as the telephone number or other identification of the audio communication terminals 130 involved, or other information. A telephony network 10 and a voice first controller 30 may communicate over, for example, communications network 8, or by other known means. Such functionality may be easily added to current telephony networks.

Figure 2:
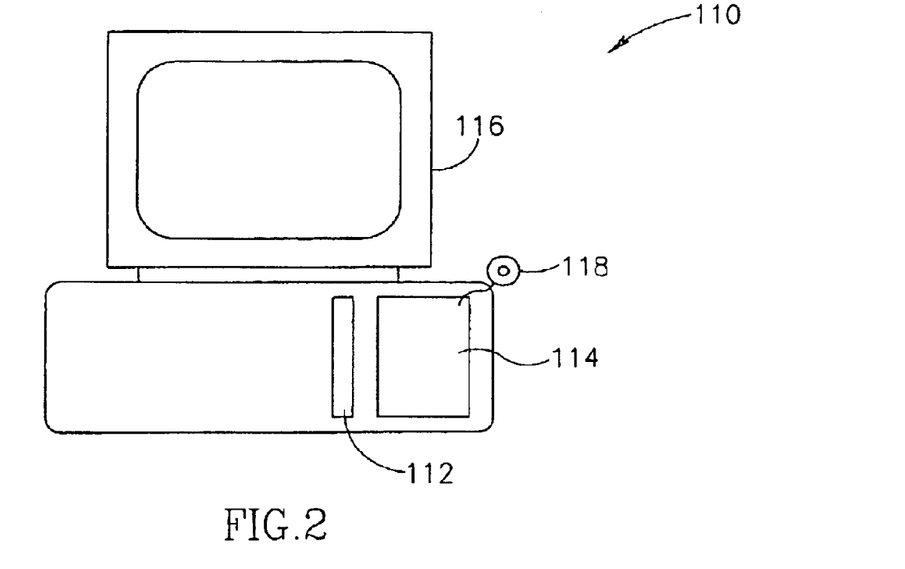
FIG. 2 depicts a videoconference terminal used with an embodiment of the system and method of the present invention.

FIG. 2 depicts a videoconference terminal used with an embodiment of the system and method of the present invention. In one embodiment, videoconference terminal 110 is a PC including a communications/networking card 112, a videoconference hardware set 114 such as a videoconference card, a monitor 116, and a video camera 118. Preferably the videoconference terminal includes compression/decompression software and/or hardware. The videoconference terminal 110 may also contain audio acquisition and play devices (e.g., an audio headset, or microphone and speaker), audio compression/decompression software and/or hardware, and a communication interface. Videoconference hardware set 114 may be of known construction, such as a commercially available PCI system including video compression/decompression capabilities such as the ViGO™ or the Escort 25 PCI card, which may be installed within a personal computer (PC) and furnished with the appropriate software, both provided by VCON, of Herzliya, Israel. Videoconference terminal 110 may include software enabling videoconference capabilities. Preferably, the videoconference terminal 110 is responsive to remote initiation of videoconference sessions. For example, the H.323 standard may be used to enable remote initiation of videoconference calls.

Other configurations are possible. In alternate embodiments videoconference terminals 110 may include other devices, such as specialized videoconference terminals or telephones, cellular devices, the assemblies of videoconference equipment (camera(s), microphone(s), controller, video screen) commonly set up in, for example, conference rooms, or other devices or assemblies. In one embodiment, the videoconference terminal 110 may include audio telephony capability, and thus may include an audio communication terminal 130. A videoconference terminal 110 may be implemented in software; for example, a videoconference terminal 110 may be a software application running on a PC or other device, using the hardware provided with that device. Known methods of providing audio telephony capability to devices such as PCs may be used.

Figure 3:
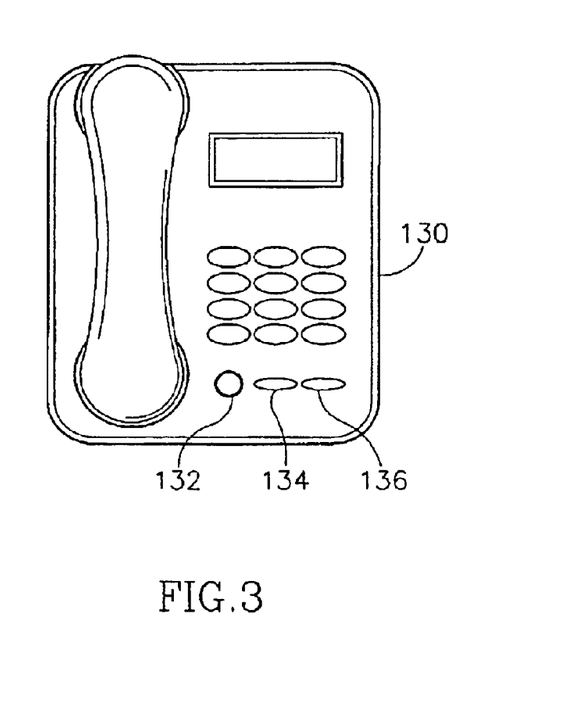
FIG. 3 depicts an audio communication terminal used with an embodiment of the system and method of the present invention.

FIG. 3 depicts an audio communication terminal used with an embodiment of the system and method of the present invention. In an exemplary embodiment, audio communication terminal 130 is an audio telephone or audio handset of known construction, and preferably includes a video indicator 132, for indicating whether or not a party in an audio conversation has video capability and is available, a video button 134, for indicating a user's preferences regarding participation in a videoconference, and a videoconference button 136, for allowing a user to indicate a videoconference is desired. The video indicator 132 may be, for example, an LED or other lamp, or an indicator on the display of the audio communication terminal 130 (if such a display is included). In alternate embodiments, the video indicator 132 need not be included, or may be in other forms. For example, if the audio communication terminal 130 is included within a workstation or PC, the video indicator 132 may be an icon or other indication on a monitor. Similarly, in alternate embodiments, the video button 134 and/or the videoconference button 136 need not be included, or may be in other forms. For example, if the audio communication terminal 130 is included within a workstation or PC, the video buttons' functionalities may be achieved via icons or keypresses.

Figure 4:
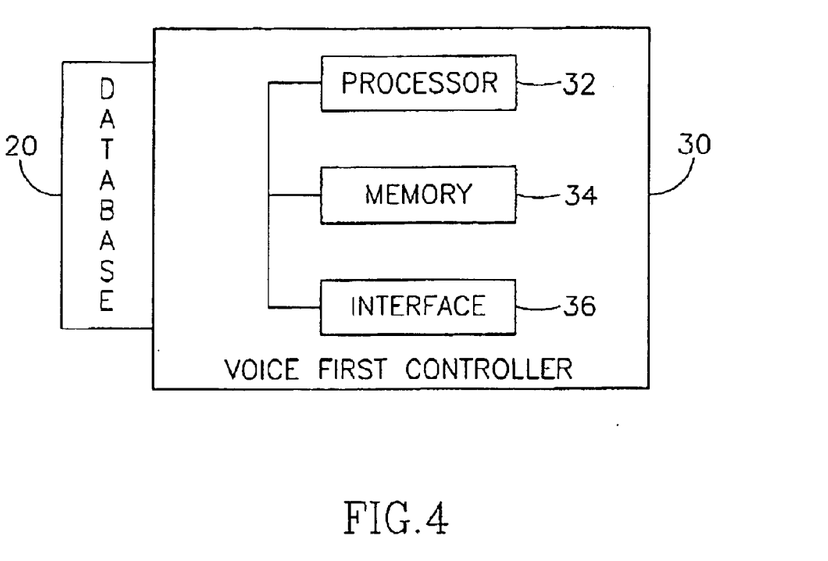
FIG. 4 depicts a voice first controller and database according to an embodiment of the system and method of the present invention.

FIG. 4 depicts a voice first controller and database according to an embodiment of the system and method of the present invention. In an exemplary embodiment, the voice first controller 30 and database 20 are co-located at the same site or within the same device. The database 20 preferably includes information regarding registered user sites of user sites 100; such a database may be located in a different device or at a different site from the voice first controller 30. The voice first controller 30 may be implemented within a workstation such as a PC implementing the Windows™ operating system or a workstation implementing Linux; such a workstation or PC may include other functionality, such as network control to functionality. In an alternate embodiment, a system including voice first controller 30 capability may be a standalone system. In the embodiment depicted in FIG. 4, voice first controller 30 includes processor 32, which may be, for example, one or more microprocessors, memory 34, and network communications interface 36.

Figure 5:
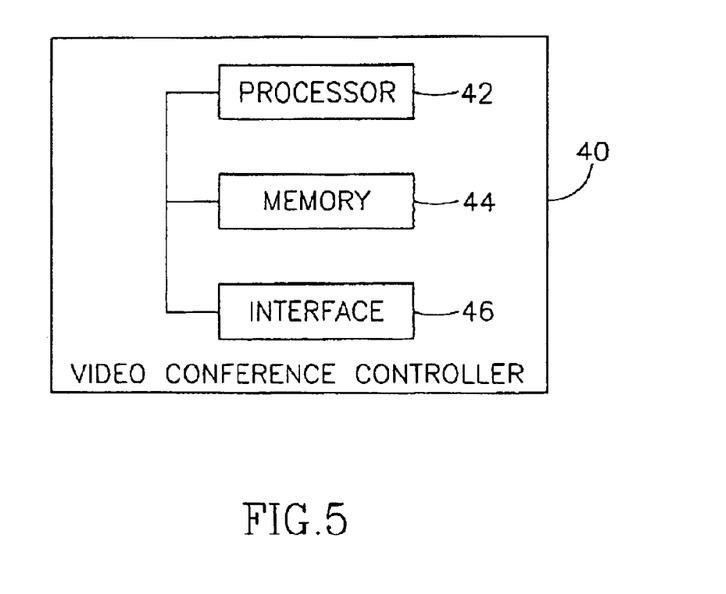
FIG. 5 depicts a videoconference controller according to an embodiment of the system and method of the present invention.

FIG. 5 depicts a videoconference controller according to an embodiment of the system and method of the present invention. In an exemplary embodiment, the videoconference controller 40 includes a processor 42, which may be, for example, one or more microprocessors, a memory 44, and a network communications interface 46. In alternate embodiments videoconference controller 40 may be located at the same site with or in the same device as the voice first controller 30 and/or database 20.

In alternate embodiments, the location and functionality of the database 20, voice first controller 30, and/or videoconference controller 40 may differ. For example, a PBX or other telephony network, intranet, or other network may include the functionality of the database 20, voice first controller 30, and/or videoconference controller 40. Such functionality may be included with existing telephony network or network equipment. The functionality of the database 20, voice first controller 30, and/or videoconference controller 40 may be located in one location, separate from a telephony network or from network equipment.

Other systems for connecting the various components may be used. For example, some or all of the various audio communication terminals 130 may be connected by a local network such as a LAN or intranet, which may include PBX such as an IP PBX; such a PBX may function as the telephony network 10 of FIG. 1. The various videoconference terminals 110 may similarly be connected by a local network such as a LAN or intranet. Each network may be connected to a voice first controller 30 via, for example, a bridge or router; alternately, the voice first controller 30 may be included in one of the local networks.

In a further embodiment, some or all of the various audio communication terminals 130 may be connected by an ISDN or PSTN telephone network including, for example, a PBX such as an ISDN PBX or other PBX which may include an analog/digital unit. The ISDN PBX may be connected to a voice first controller 30 via, for example, a gateway; alternately, the voice first controller 30 may be included in one of the local networks.

In further embodiments some or all of the various audio communication terminals 130 may be connected by the communications network 8. The communications network 8 or portions of the communications network 8 connecting the audio communication terminals 130 may be the same as or separate from the communications network 8 or portions thereof that connect the videoconference terminals 110.

In operation, a user at a user site 100 operating an audio communication terminal 130 initiates an audio telephony session (e.g., a telephone call) to another audio communication terminal 130. Preferably, the user using the audio communication terminal 130 simply enters the telephone number associated with the receiving audio communication terminal 130 (commonly termed "dialing" despite the current rarity of telephone number dials). The audio telephony session is initiated and maintained via the telephony network 10. While, typically, the initiation of an audio telephony session is from one party calling a second party, audio telephony sessions may take place among more than two parties.

Preferably, the telephony network 10 servicing the relevant audio communications terminals reports the audio telephony session to a voice first controller 30. Preferably, a call detail record (CDR) including, for example, the telephone number/address or other identification of the audio communication terminals 130 involved is passed; in alternate embodiments other information may be passed. In the case that more than one telephony network 10 services the audio communications terminals (e.g., audio communications terminals are on different telephony networks) each telephony network 10 may report the session; alternately only one network may report the session.

The voice first controller 30 accesses the database 20 for information regarding the audio communication terminals 130 involved. Preferably, the voice first controller 30 accesses information regarding whether or not videoconference capability exists for terminals associated with the relevant audio communication terminals 130, and the IP or other address of the relevant videoconference terminals 110 associated with the audio communication terminals 130.

In an exemplary embodiment, the voice first controller 30 determines status and availability information regarding the relevant videoconference terminals 110. In alternate embodiments, status and/or availability information for audio communication terminals 130 may be checked. The voice first controller 30 accesses the database 20 to translate the identity of the relevant communication terminals 130 into an address or identity for the associated videoconference terminals 110. The voice first controller 30 forwards this information to the videoconference controller 40 and requests from the videoconference controller 40 the status of each videoconference terminal 110 associated with the audio communication terminals 130—e.g., whether such terminals are active and accessible, and can participate in a videoconference. The videoconference controller 40 may directly access such videoconference terminals 110 to determine such information, or may perform this operation in other manners. In an exemplary embodiment, the videoconference controller 40 communicates with the various videoconference terminals via networks such as the communications network 8 (in which case the connections between the videoconference controller 40 and certain videoconference terminals in FIG. 1 may be via the communications network 8).

In alternate embodiments, status and information on audio communication terminals 130 and videoconference terminals 110 may be determined in different manners. For example, the videoconference controller 40 may not perform such actions; other components may gather such information in different manners.

In an exemplary embodiment, the voice first controller 30 determines, from the status information, which videoconference terminals 110 are eligible to participate in the videoconference, and passes this information to the videoconference controller 40. Information and commands passed between the voice first controller 30 and videoconference controller 40 may be passed directly or by means of third entity; in alternate embodiments the voice first controller 30 and videoconference controller 40 functionalities may be in the same device.

An indication may be provided to participants in the audio session if any of the other users have video capability which is operational and in communication with the videoconference controller 40. In a typical embodiment, if any of the users have video capability which is operational and in communication with the videoconference controller 40, a video indicator 132 indicates such information to the other users. In alternate embodiments, a video indicator 132 may indicate other information.

If the users participating in the audio telephony session desire to enter a videoconference, each user may activate the appropriate videoconference button 136. The audio communication terminal 130 transmits a signal regarding the user action to, typically, the relevant telephony network 10. In a typical embodiment, each user with active and accessible videoconference capability must press their appropriate videoconference button 136 before the videoconference may be started.

In alternate embodiments, other protocols may be used. For example, a user may press a videoconference button 136 to grant permission to be viewed in videoconference mode. The videoconference button 136 may be an on/off type switch such that, when on, a videoconference is automatically started at the time of the initiation of the audio session. If the videoconference button 136 is in one position, it is an indication that the user is allowing a videoconference, if in another position, the user is not allowing such a conference.

In alternate embodiments, no "permission" capability need be included, or such permission information may be ascertained through other methods. For example, a video button 134 and/or videoconference button 136 may be included on a videoconference terminal 110, or a setting on a PC acting as an audio communication terminal 130 or a videoconference terminal 110 may be ascertained. In further embodiments, other user preferences may be taken into consideration when initiating and carrying out videoconferences. In alternate embodiments, other methods may be used, and other signals may be generated, to initiate a videoconference.

Information regarding the video button 134 and/or videoconference button 136 may be transmitted to the videoconference controller 40 directly from audio communication terminals 130 or via the relevant telephony network 10, or in other manners.

The videoconference controller 40 initiates a videoconference among the set of the videoconference terminals 110 associated with the audio communication terminals 130, or a subset of such videoconference terminals 110, depending on information such as permission and availability information.

Some videoconference terminals must be set to a certain mode, e.g. an answer, autoanswer or other mode, to be receptive to a videoconference controller command to initiate a videoconference. In such a case, either the relevant videoconference terminals 110 are in such a mode prior to the initiation of the videoconference, or just before the videoconference, the videoconference controller 40 sends a command to the relevant videoconference terminals 110 to enter such a mode. In alternate embodiments, such a mode change need not be required. For example, a videoconference terminal not in such a mode may accept a command requiring the initiation of a videoconference without an answer or user acceptance. In further embodiments, a videoconference terminal may not be able to "autoanswer" and be forced into a videoconference. In such a case, a user action, such as a "pickup" or answer, may be required after the videoconference controller 40 requests the videoconference terminal to enter a videoconference.

After the videoconference controller 40 requests the relevant videoconference terminals 110 to enter the videoconference, the videoconference controller may need to join the videoconference terminals 110 into the videoconference.

The videoconference takes place simultaneously with the audio telephony session. Preferably, no audio is transmitted via the videoconference, and the audio telephony session transmits the audio channel of the videoconference. The relevant videoconference terminals 110 display and capture video data associated with the videoconference, and the relevant audio communication terminals 130 output and capture the audio data associated with the videoconference. The user may continue to use the audio communication terminals 130 to communicate, even after the videoconference terminals 110 enter the videoconference.

In some videoconference systems, the transmission and display of captured video images may be delayed a certain amount, possibly due to compression and decompression, or due to other causes. Therefore, audio data transmitted by the audio telephony session may be delayed a similar amount, in order that the users perceive the video and audio data as being in synchrony. In an exemplary embodiment, this delay is performed by buffering capability included at the relevant telephony network 10; in alternate embodiments other delay methods may be used. For each audio channel associated with a video channel, the audio data enters a buffer where it is held a certain amount of time before being forwarded onward. Such capability is easily added to current telephony networks. In alternate embodiments, delay capability may be added to other components, such as the audio communication terminals 130.

Various methods may be used to determine the time delay. In one embodiment, a fixed time delay may be used. In another embodiment, for each audio telephony session, the delay may be fixed beforehand by the characteristics of the components involved, such as the videoconference terminals 110 or any equipment or networks transmitting videoconference data (e.g., network or videoconference controller 40 load), and a delay calculated. Data on such equipment may come from the database 20 (e.g., the known delay for the videoconference terminal 110, network, or other equipment associated with each user), from a query to the relevant equipment at the time of the initiation of the videoconference, or by other methods. In yet a further embodiment, the actual delay of the video data experienced by the videoconference terminals 110 may be periodically ascertained during the videoconference, and the delay adjusted accordingly. In certain embodiments, data on a delay may need to be transmitted from, for example, the videoconference controller 40, to other equipment such as the telephony network 10.

In alternate embodiments, different series of steps may be used. In alternate embodiments, a database lookup need not be required. Furthermore, different sets of status information, may be used, or no status information may be required Embodiments of the system and method of the present invention eliminate the requirement of planning a videoconference in advance. The requirement of having training and access to videoconference equipment separate from preferably simple and ubiquitous audio communication terminals 130 may be eliminated, simplifying the process of initiating a videoconference session. Preferably, the initiation of such a session becomes as easy as initiating a telephone call.

Preferably, any set of users (e.g., two or more) communicating by audio terminals may participate in videoconference sessions using the system and method of the present invention. An additional user may enter an existing teleconference via steps similar to those described herein. When a teleconference is initiated, the so various components of embodiments of the system of the present invention may add users of the teleconference to the videoconference.

Preferably, if a user "hangs up" or otherwise terminates an audio telephony session, or if the user switches the setting on the video button 134 and/or videoconference button 136 to indicate no video is desired, the videoconference may be stopped with respect to that user. In one embodiment, if the video button 134 and/or videoconference button 136 is pressed, or if the video button 134 and/or videoconference button 136 setting is altered, the audio communication terminal 130 passes this information to the voice first controller 30. If the audio telephony session is ended, the relevant telephony network 10 passes this information to the voice first controller 30. The voice first controller 30, in turn causes the videoconference controller 40 to remove the relevant videoconference terminal 110 from the videoconference. In alternate embodiments, other situations may cause the cessation of a videoconference.

In further embodiments, an existing audio telephony session which has no current videoconference may have a videoconference included. For example, a user may alter a setting on a switch on a videoconference terminal 110 or an audio communication terminal 130 to easily initiate a videoconference to complement an existing audio telephony session.

In further embodiments, an audio telephony session may cause the initiation of a one way video conference. For example, in the case of a party calling a call center, video information may be transmitted from the call center to the calling party. Such a one-way video session may be initiated by an embodiment of the present invention.

Figure 6:
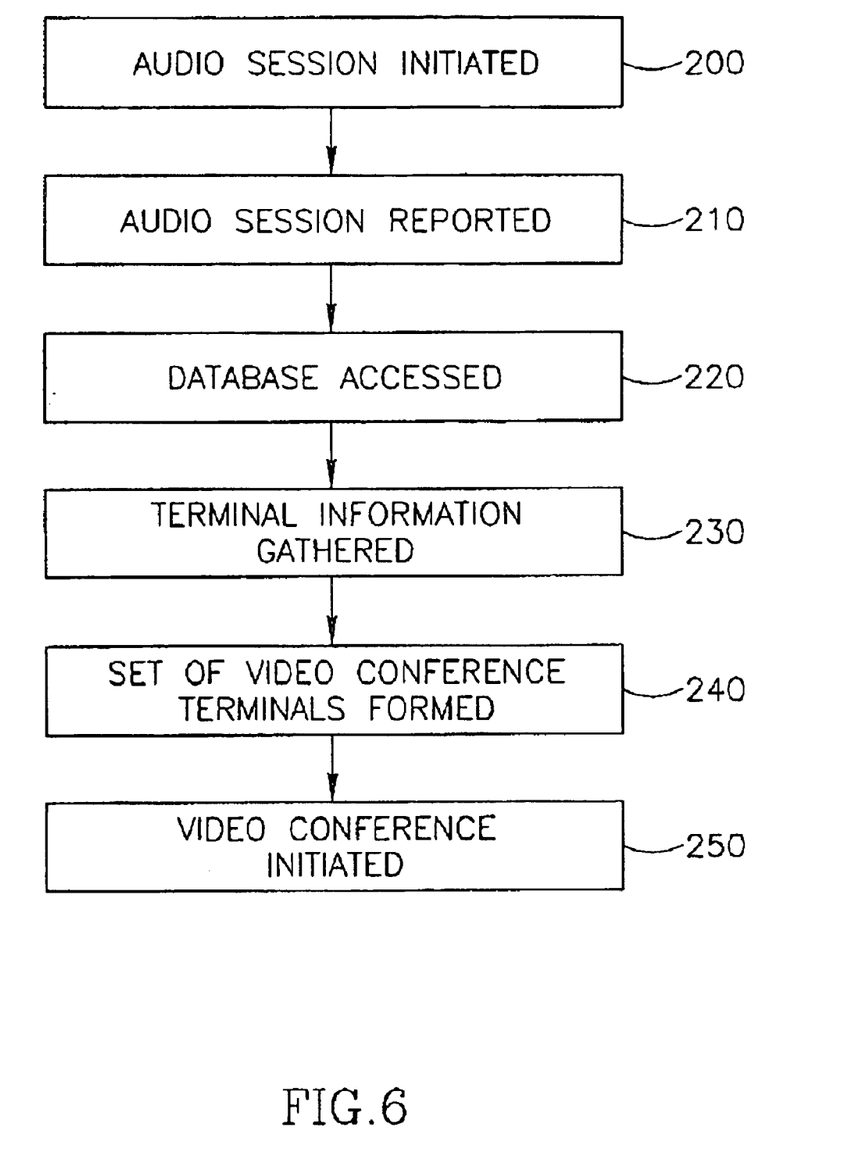
FIG. 6 is a flow chart depicting a series of steps for initiating a videoconference according to an embodiment of the system and method of the present invention.

FIG. 6 is a flow chart depicting a series of steps for initiating a videoconference according to an embodiment of the system and method of the present invention.

Referring to FIG. 6, in step 200 a user initiates an audio session. For example, a user places a telephone call using an audio communication terminal 130. While, typically, such an initiation occurs between two parties who are not yet in audio contact, embodiments of the system and method of the present invention may allow for an existing audio session between two or more parties which may include existing videoconference sessions to add additional audio and video participants. For example, one of two parties engaged in an audio session and a videoconference may contact a third via telephone; the third party may then be automatically joined in to the video conference.

In step 210, the telephony network(s) 10 servicing the audio communication terminals 130 report(s) the audio telephony session. Preferably, such information is reported to a voice first controller 30, but other components or combinations of components may receive and act on such information. For example, functionality within a telephony network 10 may detect a telephony session and perform steps 220–250, below.

In step 220, a database is accessed for information regarding the relevant audio communication terminals 130. In alternate embodiments, a database access need not be required.

In step 230, status and availability information is determined regarding the relevant videoconference terminals 110 and possibly regarding the associated audio communication terminals 130. In an exemplary embodiment, a videoconference controller 40 is polled for the status of the relevant videoconference terminals 110. In alternate embodiments, status and availability information may include other data and may be determined through other methods. For example, the relevant audio communication terminals 130 may be polled for certain settings.

In step 240, it is determined which videoconference terminals 110 are able to participate in the videoconference. While, preferably, this determination is made by a voice first controller 30, in alternate embodiments this determination may be made by other components, such as a videoconference controller 40.

In step 250, a videoconference is initiated among the relevant videoconference terminals 110. Preferably, a videoconference controller 40 performs such a function, although other components may perform this function. In one embodiment, users may be required to signal their desire to enter a videoconference prior to the videoconference. In alternate embodiments, user signals need not be required.

In alternate embodiments, other series of steps may be performed.

It will be appreciated by persons skilled in the art that the present invention is not limited by what has been particularly shown and described hereinabove. Alternate embodiments are contemplated which fall within the scope of the invention.

What is claimed is:

1. A method of establishing a video conferencing link, comprising:

establishing an audio communication session with each of two or more users;

consulting an automated database to determine a videoconferencing capability for each of said two or more users;

initiating with each of said users determined to have videoconferencing capabilities a videoconferencing session through a common intermediary communication device; and disconnecting said intermediary communication device, such that a teleconference session between each of said users determined to have videoconferencing capabilities is enabled.

2. A method according to claim 1, wherein said initiating comprises initiating a plurality of videoconferencing sessions.

3. A method according to claim 2, wherein said disconnecting, comprises maintaining a plurality of videoconference sessions.

4. A method according to claim 1, wherein said consulting comprises determining a current videoconferencing availability status for each of said two or more users.

5. A method according to claim 4, wherein said determining, comprises requesting users determined to have videoconferencing capabilities to authorize the initiation of said videoconferencing session, and wherein the initiation of said videoconferencing session is enabled upon receiving a videoconferencing authorization from said users.

6. A method according to claim 1, wherein said establishing an audio communication session, comprises establishing said audio communication session over a telephony network.

7. A method according to claim 6, wherein said establishing an audio communication session, comprises establishing said audio communication session over a PBX.

8. A method according to claim 1, wherein said establishing audio communication session, comprises establishing said audio communication session over an IP network.

9. A method according to claim 1, wherein said initiating, comprises initiating with each of said users determined to have videoconferencing capabilities a videoconferencing session over an IP network.

10. A method according to claim 1, wherein said establishing comprises connecting to each of said two or more users through a first terminal.

11. A method according to claim 10, wherein said initiating comprises connecting an intermediary communication device to each of said users determined to have videoconferencing capabilities through a second terminal.

12. A method according to claim 1, wherein said disconnecting comprises disconnecting said audio session.

13. A method according to claim 1, wherein said disconnecting comprises maintaining said audio session.

14. A method according to claim 1, wherein said initiating comprises enabling a videoconferencing communication between each of said users determined to have video conferencing capabilities.

15. A method according to claim 14, wherein said audio session provides an audio channel of a videoconferencing communication and said videoconferencing session provides a visual channel of said videoconferencing communication.

16. A method according to claim 14, comprising synchronizing said videoconferencing communication, such that at least said audio channel and said visual channel are synchronized.

17. A method according to claim 14, wherein said videoconferencing communication comprises one or more data blocks selected from a group consisting of: video, visual streaming, visual stills image, application sharing, web conferencing and instant messaging data.

18. A method according to claim 1, wherein said identification data is a call details record.

19. A method of establishing a video conferencing link, comprising:

establishing an audio communication session with each of N users;

consulting an automated database to determine a videoconferencing capability for each of said N users;

initiating with each of said users determined to have videoconferencing capabilities a videoconferencing session through a common intermediary communication device; and disconnecting said intermediary communication device, such that a teleconference session between each of said users determined to have videoconferencing capabilities is enabled.

20. A method according to claim 19, wherein said initiating comprises initiating a plurality of videoconferencing sessions.

21. A method according to claim 20, wherein said disconnecting, comprises maintaining a plurality of videoconference sessions.

22. A method of establishing a video conferencing link, comprising:

establishing an audio communication session between a source user and at least one destination user;

consulting an automated database to determine a videoconferencing capability for each of said at least one destination users;

initiating with said source user and each of said at least one destination users determined to have videoconferencing capabilities a videoconferencing session through a common intermediary communication device;

disconnecting said intermediary communication device, such that a teleconference session between said source user and each of said at least one destination users determined to have videoconferencing capabilities is enabled.

23. A method according to claim 22, wherein said consulting comprises consulting an automated database to determine a videoconferencing capability for said source user.

24. A method according to claim 23, wherein said initiating is enabled only after receiving an indication that said user is determined to have videoconferencing capabilities.

* * * * *